US008749343B2

(12) United States Patent
Cirker

(10) Patent No.: US 8,749,343 B2
(45) Date of Patent: Jun. 10, 2014

(54) SELECTIVELY ENABLED THREAT BASED INFORMATION SYSTEM

(76) Inventor: Seth Cirker, Port Washington, NY (US)

( * ) Notice: Subject to any disclaimer, the term of this patent is extended or adjusted under 35 U.S.C. 154(b) by 812 days.

(21) Appl. No.: 11/717,806

(22) Filed: Mar. 14, 2007

(65) Prior Publication Data

US 2008/0224862 A1 Sep. 18, 2008

(51) Int. Cl.
*G05B 23/00* (2006.01)

(52) U.S. Cl.
USPC ..... 340/3.1; 340/506; 348/E70.85; 348/E70.9

(58) Field of Classification Search
USPC ......... 340/3.1, 3.3, 3.31, 3.32, 541, 506, 521, 340/523, 540; 348/156, 154; 726/26, 27
See application file for complete search history.

(56) References Cited

U.S. PATENT DOCUMENTS

| | | | | |
|---|---|---|---|---|
| 4,019,192 | A | 4/1977 | Miyagawa | |
| 4,080,629 | A | 3/1978 | Hammond | |
| 4,283,132 | A | 8/1981 | Engelsmann et al. | |
| 4,857,912 | A | 8/1989 | Everett, Jr. et al. | |
| 4,978,984 | A | 12/1990 | Brookfield | |
| 5,455,561 | A | 10/1995 | Brown | |
| 5,610,656 | A | 3/1997 | Bernhardt | |
| 5,666,157 | A | 9/1997 | Aviv | |
| 5,740,480 | A | 4/1998 | Kuhn et al. | |
| 6,064,430 | A | 5/2000 | Lefkowitz | |
| 6,354,749 | B1 | 3/2002 | Pfaffenberger, II | |
| D470,522 | S | 2/2003 | Friedricks et al. | |
| 6,524,020 | B2 | 2/2003 | Ellinger et al. | |
| 6,652,164 | B2 | 11/2003 | Stiepel | |
| 6,696,957 | B2 | 2/2004 | Shepher | |
| 6,768,868 | B1 | 7/2004 | Schnell | |
| 6,816,073 | B2 | 11/2004 | Vaccaro | |
| 6,850,025 | B1 | 2/2005 | Paolantonio et al. | |
| 6,917,293 | B2 | 7/2005 | Beggs | |
| 6,940,397 | B1 | 9/2005 | Le Mire | |
| 7,066,662 | B2 | 6/2006 | Cuddeback | |
| 7,088,387 | B1 | 8/2006 | Freeman et al. | |
| 7,095,328 | B1 * | 8/2006 | Stern et al. | 340/573.1 |
| 7,119,832 | B2 | 10/2006 | Blanco et al. | |
| 7,131,136 | B2 | 10/2006 | Monroe | |
| 7,187,279 | B2 | 3/2007 | Chung | |
| 7,217,045 | B2 | 5/2007 | Jones | |
| 7,280,030 | B1 | 10/2007 | Monaco | |

(Continued)

FOREIGN PATENT DOCUMENTS

| | | | |
|---|---|---|---|
| EP | 1244322 | B1 | 6/2005 |
| GB | 02/384933 | A1 | 8/2003 |

(Continued)

OTHER PUBLICATIONS

Supplementary European Search Report for European Patent Application No. EP08782751.5, dated Aug. 22, 2011.

(Continued)

*Primary Examiner* — Mohammad Ghayour
*Assistant Examiner* — Nay Tun
(74) *Attorney, Agent, or Firm* — Bryan G. Pratt; Holland & Hart, LLP

(57) ABSTRACT

A method for selectively monitoring a privacy sensitive area includes assigning the privacy sensitive area a privacy threshold value, receiving a threat level, and activating surveillance equipment associated with said privacy sensitive area when said threat level exceeds said privacy threshold value.

22 Claims, 4 Drawing Sheets

(56) References Cited

U.S. PATENT DOCUMENTS

| | | | | |
|---|---|---|---|---|
| 7,463,145 | B2 * | 12/2008 | Jentoft | 340/541 |
| 7,471,334 | B1 | 12/2008 | Stenger | |
| 7,477,285 | B1 * | 1/2009 | Johnson | 348/143 |
| 8,000,588 | B1 | 8/2011 | Harvey | |
| 8,123,419 | B2 | 2/2012 | Cirker | |
| 2001/0037509 | A1 | 11/2001 | Kligman | |
| 2002/0081110 | A1 | 6/2002 | Johnson et al. | |
| 2003/0053536 | A1 | 3/2003 | Ebrami | |
| 2003/0102967 | A1 | 6/2003 | Kao | |
| 2003/0210139 | A1 | 11/2003 | Brooks | |
| 2004/0003051 | A1 | 1/2004 | Krzyzanowski et al. | |
| 2004/0008253 | A1 | 1/2004 | Monroe | |
| 2004/0013192 | A1 | 1/2004 | Kennedy | |
| 2004/0032493 | A1 | 2/2004 | Franke et al. | |
| 2004/0075547 | A1 | 4/2004 | Voijtech et al. | |
| 2004/0119591 | A1 | 6/2004 | Peeters | |
| 2004/0190767 | A1 | 9/2004 | Tedesco et al. | |
| 2004/0246127 | A1 | 12/2004 | Junqua | |
| 2004/0253926 | A1 | 12/2004 | Gross | |
| 2005/0104773 | A1 | 5/2005 | Clarke et al. | |
| 2005/0119584 | A1 | 6/2005 | Carter | |
| 2005/0123172 | A1 | 6/2005 | Henson | |
| 2005/0146609 | A1 | 7/2005 | Creamer et al. | |
| 2005/0146610 | A1 | 7/2005 | Creamer et al. | |
| 2005/0149979 | A1 | 7/2005 | Creamer et al. | |
| 2005/0181762 | A1 | 8/2005 | Kauppila | |
| 2005/0186954 | A1 | 8/2005 | Kenney | |
| 2005/0225635 | A1 | 10/2005 | Meitzler et al. | |
| 2005/0248444 | A1 | 11/2005 | Joao | |
| 2005/0288075 | A1 | 12/2005 | Geernaert | |
| 2006/0000971 | A1 | 1/2006 | Jones et al. | |
| 2006/0022829 | A1 | 2/2006 | Pan | |
| 2006/0050150 | A1 | 3/2006 | Yamane | |
| 2006/0063523 | A1 | 3/2006 | McFarland | |
| 2006/0064384 | A1 * | 3/2006 | Mehrotra et al. | 705/57 |
| 2006/0080541 | A1 | 4/2006 | Monaco et al. | |
| 2006/0098729 | A1 | 5/2006 | Shen | |
| 2006/0104444 | A1 | 5/2006 | Hampapur et al. | |
| 2006/0109113 | A1 | 5/2006 | Reyes et al. | |
| 2006/0253885 | A1 | 11/2006 | Murphy et al. | |
| 2007/0011722 | A1 | 1/2007 | Hoffman et al. | |
| 2007/0013513 | A1 | 1/2007 | Tang et al. | |
| 2007/0040672 | A1 | 2/2007 | Chinigo | |
| 2007/0205876 | A1 | 9/2007 | Nguyen | |
| 2007/0207750 | A1 | 9/2007 | Brown et al. | |
| 2007/0269202 | A1 | 11/2007 | Forsyth-Martinez | |
| 2008/0198159 | A1 * | 8/2008 | Liu et al. | 345/420 |
| 2008/0198231 | A1 | 8/2008 | Ozdemir | |
| 2008/0224862 | A1 | 9/2008 | Cirker | |
| 2008/0259161 | A1 | 10/2008 | Hellman | |
| 2008/0288986 | A1 | 11/2008 | Foster et al. | |
| 2009/0021593 | A1 | 1/2009 | Nozaki | |
| 2009/0028542 | A1 | 1/2009 | Nakamoto et al. | |
| 2009/0098820 | A1 | 4/2009 | Yabu | |
| 2009/0138138 | A1 | 5/2009 | Ferren et al. | |
| 2009/0185036 | A1 | 7/2009 | Bowron | |

FOREIGN PATENT DOCUMENTS

| | | | |
|---|---|---|---|
| GB | 02/393343 | A1 | 3/2004 |
| JP | 56099835 | A | 8/1981 |
| JP | 2002158904 | A | 5/2002 |
| KR | 1020030052511 | A | 6/2003 |
| WO | WO9501041 | A1 | 1/1995 |
| WO | WO0117247 | A1 | 3/2001 |
| WO | WO0156294 | A1 | 8/2001 |
| WO | 03041026 | | 5/2003 |
| WO | WO03/041026 | A1 | 5/2003 |
| WO | 2004030512 | A2 | 4/2004 |
| WO | WO/2004/095386 | A1 | 11/2004 |

OTHER PUBLICATIONS

Supplemental European Search Report, EP 08 83 1720, Nov. 22, 2010 (7 pgs.).

Polycom, ViaVideo User's Guide, Nov. 2000.

iSight User's Guide, Apple Computer, Inc., 2004.

* cited by examiner

SELECTIVELY ENABLED THREAT BASED INFORMATION SYSTEM

BACKGROUND

Surveillance or monitoring apparatuses often use at least one video camera, allowing surveillance images to be viewed and/or recorded at a remote location. For example, an industrial facility, a public school, or a medical facility may have several video cameras at various locations throughout the facility, each camera being communicatively coupled to a respective video screen at one or more central security station(s).

More recently, video cameras have been developed that can be coupled to a computer hosting any number of software programs capable of converting video images received from the video cameras into a digital format, or in other words a document compatible with the Internet standard known as the world wide web (www). Further, personal communication devices such as cellular phones, pagers, and personal digital assistants (PDAs) are becoming increasingly popular commercial products, as wireless communication technology becomes widespread and affordable. Additionally, a number of cellular phone manufacturers are manufacturing and selling camera phones or other smart phones having video displays capable of displaying received images or camera capabilities capable of generating desired images. Consequently, it is possible to transmit a surveillance image from a known video camera to a personal communication device using image conversion software.

The use of the ever improving monitoring and imaging devices that may be used for security and surveillance are tempered by the concept of an individual's right to privacy. That is, there are a number of locations, such as within restrooms, changing rooms, and even classrooms, where permanently active monitoring devices are not appropriate. However, when high risk situations such as shootings, hostage situations, or natural disasters occur, an individual's right to privacy may be superseded by a need for surveillance.

While existing monitoring systems have traditionally been adequate for their intended purposes, they have not been satisfactory in all respects. For example, and as mentioned above, when a high risk situation occurs, traditional monitoring systems do not provide a convenient way for the owner or authorities to monitor previously restricted locations.

SUMMARY

An exemplary system for allowing video surveillance systems to provide variable levels of observation proportionate to the current threat levels includes a surveillance system interface configured to selectively activate and deactivate inputs and outputs to surveillance system components based on a received threat level and controlling software defining which inputs and outputs are selectively activated based on a received threat level.

According to one exemplary method, a surveillance system assigns a privacy threshold to privacy sensitive areas, receives a current threat level indicator, compares the current threat level indicator to the privacy threshold, and if the current threat level indicator exceeds the privacy threshold, identifies surveillance components associated with the privacy sensitive areas and activates the identified surveillance components.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary method and apparatus for allowing video and/or audio surveillance systems to provide variable levels of observation proportionate to perceived threat levels is described herein. More specifically, an exemplary monitoring system includes a surveillance system interface configured to selectively activate and deactivate inputs and outputs to surveillance devices based on a received threat level. Additionally, the present exemplary monitoring system includes controlling software defining which inputs and outputs are selectively activated based on a received threat level. In conjunction with the previously mentioned apparatus, a method is described for determining which surveillance devices are activated, based on a privacy threshold value and a perceived threat level. The present specification discloses the components and various exemplary methods for their application and implementation.

As used in this specification and in the appended claims, the term "mobile communication device" is meant to be understood broadly as any wireless communication device that does not directly and physically connect with a phone, internet, or other communication cable. Similarly, as used herein the term "surveillance device" is meant to be understood broadly as including any device used for monitoring one or more people or a space including, but in no way limited to, image receiving devices such as cameras, audio receiving devices such as microphones, motion detecting devices, and the like.

In the following description, for purposes of explanation, numerous specific details are set forth in order to provide a thorough understanding of the present system and method for allowing video and/or audio surveillance systems to provide variable levels of observation proportionate to perceived threat levels. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
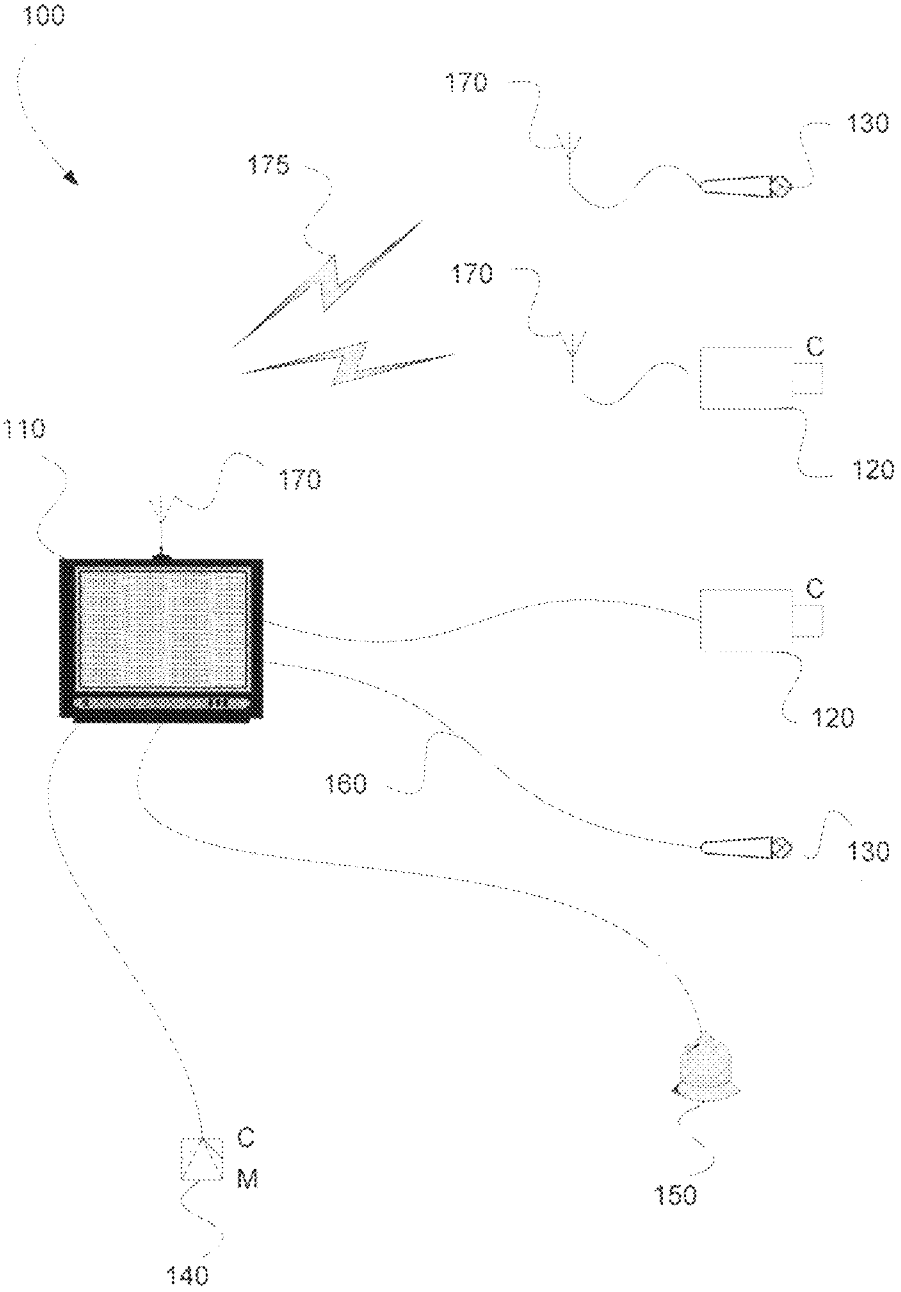
FIG. 1 Prior Art
FIG. 1 is a simple block diagram illustrating a surveillance system, according to one exemplary embodiment.

FIG. 1 illustrates a prior art surveillance system (100) that may be modified to operate according to the present exemplary system and method. Specifically, as illustrated in FIG. 1, a traditional surveillance system (100) may include any number of surveillance components. The exemplary system of FIG. 1 includes a plurality of audio collection devices (130) such as microphones, a plurality of image collection devices (120) such as cameras, one or more motion sensors (140), an audible alarm component (150), and a central monitoring/processing device (110). As illustrated in FIG. 1, the various surveillance components (120-150) may be communicatively coupled to the central monitoring/processing device (110) by either a dedicated hardwire connection (160) or a wireless connection (175) facilitated by any number of wireless transmitters and receivers (170). Additionally, the prior art surveillance system (100) may be communicatively coupled to a standard telephone line or a mobile telecommunications system (not shown). According to one exemplary embodiment, the exemplary prior art surveillance system (100) may be configured to effectively monitor a remote area of interest. However, as mentioned previously, activation and monitoring of the various surveillance components in private locations must be tempered by the rights of the individuals being monitored. Consequently, there is a need for a surveillance system that selectively activates surveillance components in sensitive areas only when a perceived threat level justifies the activation.

Figure 2:
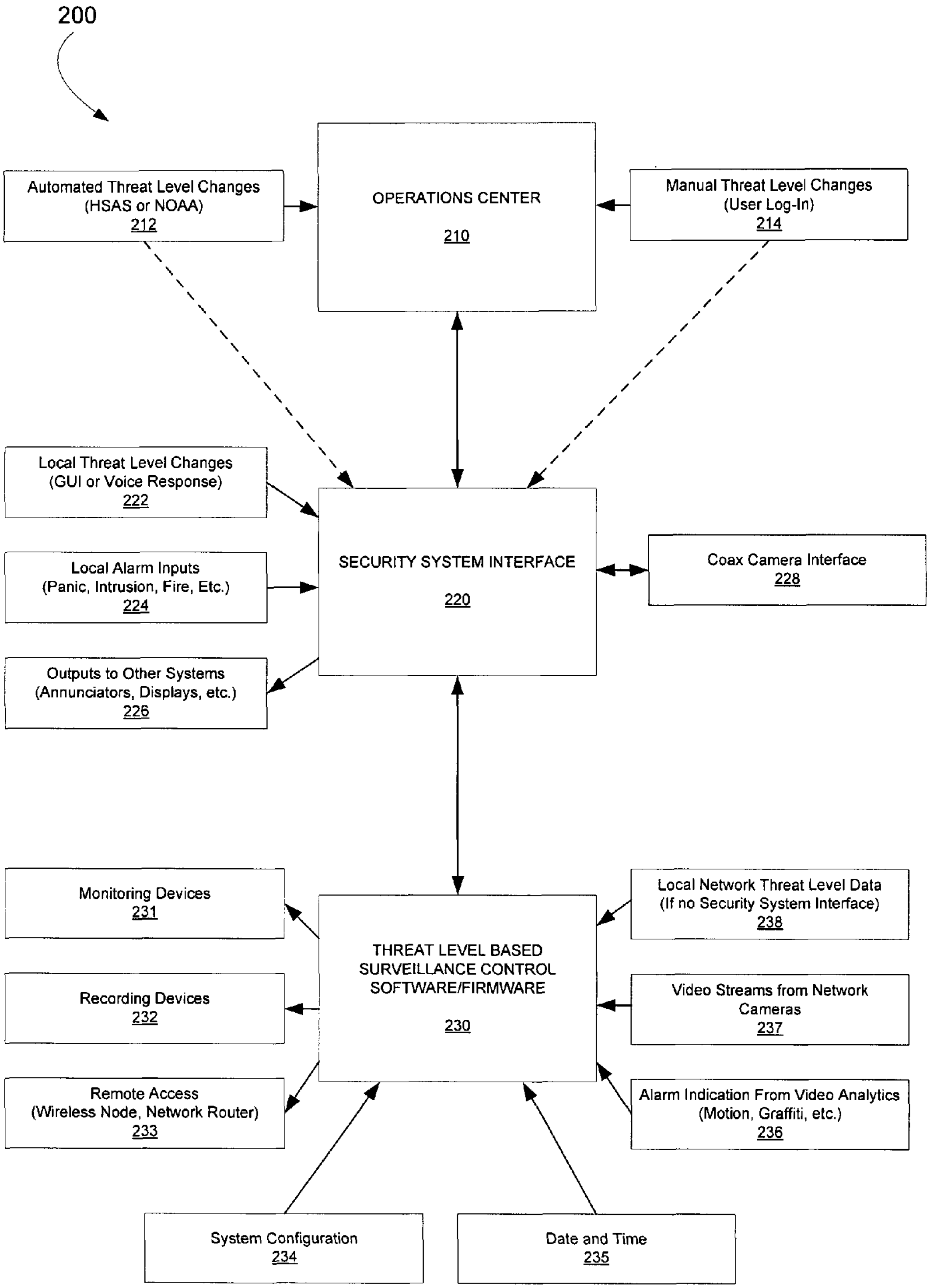
FIG. 2 is a simple block diagram illustrating the components of a threat based configurable surveillance system, according to one exemplary embodiment.

FIG. 2 illustrates an exemplary threat based surveillance control system (200) configured to allow video and other surveillance systems to provide variable levels of observation proportionate to perceived threat levels, according to one exemplary embodiment. Specifically, according to one exemplary embodiment, the present threat based surveillance control system (200) is configured to interrupt and automatically regulate a connection between the cameras and other surveillance devices of a surveillance system and the monitoring (231) and recording (232) components. Utilizing rules established as software or firmware (230) within the system (200), the system determines which surveillance devices are to be connected to any selective number of monitoring devices, such as recorders (232) or monitors (231), under specific threat levels. For example, according to one exemplary embodiment, cameras that were traditionally permanently connected to recording and/or monitoring equipment can be selectively disconnected from the recording and/or monitoring equipment, and thereby may be unobserved until perceived threats justify connection of the cameras to the recording and/or monitoring equipment. Permissions to make these connections are granted based upon changes in threat levels including data automatically provided by any number of sources including, but in no way limited to, Federal, State and Local governments such as the Homeland Security Advisory System for terrorist threats (HSAS) or the National Oceanic & Atmospheric Administration for natural disasters (NOAA). According to the present exemplary system and method, threat level information can be provided to the exemplary threat based surveillance control system (200) through wired and/or wireless connections. Furthermore, a log detailing the individual or event responsible for each identified threat level changes is maintained, thereby providing accountability for any increase or decrease in surveillance level. Details of the present exemplary threat based surveillance control system (200) and its operation will be provided below with reference to FIGS. 2-5.

As illustrated in FIG. 2, the present exemplary threat based surveillance control system (200) can include an operations center (210) communicatively coupled to a security system interface (220) and a threat level based surveillance control software/firmware (230). According to one exemplary embodiment illustrated in FIG. 2, the operations center (210) is configured to provide threat level information to the security system interface (220). Specifically, according to one exemplary embodiment, the operations center (210) is communicatively coupled to any number of sources authorized to provide threat based indications including, but in no way limited to, automated threat level sources (212) or manually authorized threat level sources (214). As illustrated, automated threat level sources (212) capable of automatically providing threat based indications may include, but are in no way limited to Federal, State and Local governments such as the Homeland Security Advisory System for terrorist threats (HSAS) or the National Oceanic & Atmospheric Administration for natural disasters (NOAA). Further, manually authorized threat level sources (214) may include, but are in no way limited to supervisors, principals, or other supervisory personnel having an authorized user log-in. The operations center (210) may be an external "manned" service dedicated to monitoring perceived conditions for a number of clients, or, alternatively, the operations center (210) may be an individual component of the threat based surveillance control system (200).

According to the present exemplary system and method, the operations center (210) may receive and determine a threat based indication via any number of communication interfaces including, but in no way limited to, local wired and/or wireless connections such as computers including desktops, laptops, tablets, handhelds or personal digital assistants (PDAs); panic buttons which may enable predefined functions such as recording, activating an alarm and displaying the appropriate video on a monitor; external transmitters such as activation of a "Police Department" or "Fire Department" transmitter during an emergency response; a voice response system which allows access using devices such as wired, wireless, cellular or Voice Over I.P. (VOIP) phones; internet connection which allows a broadband connection to connect to the system from a remote location; dial-up connection which allows a low speed data connection to be utilized to connect to the system from a remote location. (i.e. via a "cellular modem" or telephone line); and/or a wireless (cellular/radio) interface configured to provide an alternate remote connection should telephone lines and/or internet connections be unavailable. According to one exemplary embodiment, the above-mentioned communication interfaces may be used to communicatively couple the threat level sources (212, 214) with the operations center (210) and to communicatively couple the operations center with the security system interface (220).

Figure 3:
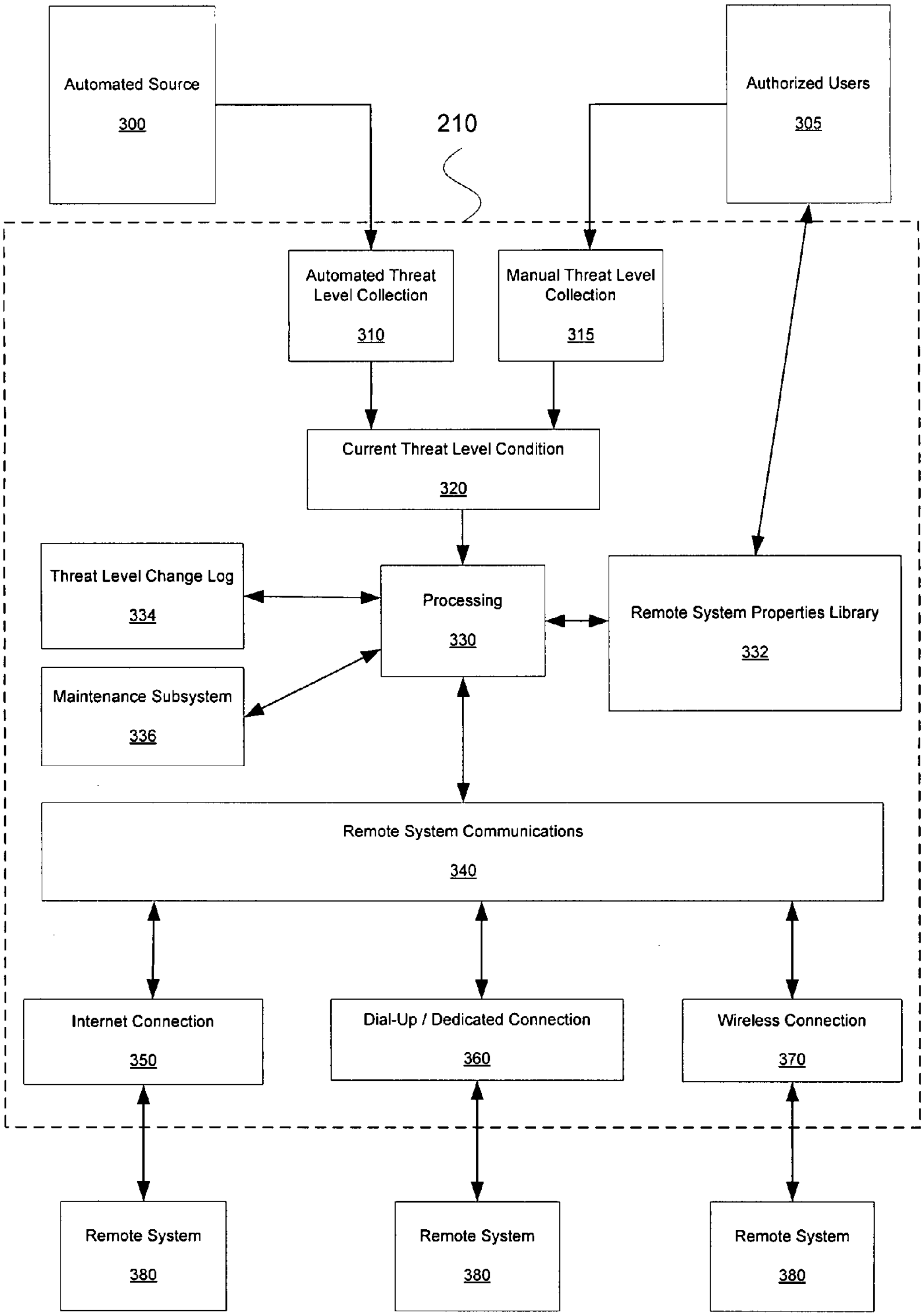
FIG. 3 is a simple block diagram illustrating the operational configuration and interaction of an operations center, according to one exemplary embodiment.

FIG. 3 illustrates an exemplary operational configuration and interaction of an operations center (210), according to one exemplary embodiment. As illustrated in FIG. 3, threat information may be received from a national automated source (300) or by authorized users (305) and may be received by an automated threat level collection module (310) or a manual threat level collection module (315). Additionally, threat information may be transmitted to a remote system properties library (332) for future processing. The received threat information is collected to establish a current threat level condition (320). The current threat level condition (320) is then processed (330) by the operations center, according to pre-determined treatment rules, to determine threat levels and may assign a quantitative value to the threat levels. Once existing threat levels have been determined, the threat levels and the surrounding circumstances can be stored in a threat level change log (334) for future analysis. Additionally, the change in threat levels is also transmitted to the maintenance subsystem (336). According to one exemplary embodiment, the maintenance subsystem (336) is configured to supervise the condition of remote systems such that if an equipment failure occurs, the maintenance subsystem (336) alerts the operations center (210) so that a notice may be relayed to an appropriate system administrator. By providing the maintenance subsystem (336) with changes in threat levels, the maintenance subsystem may actively supervise all of the components active during an identified threat level.

With the threat level determined, it is then transmitted to the remote system communications portion (340) of the operations center (210). The communications portion (340) of the operations center (210) can then transmit the determined threat level to any number of remote systems (380) via various communication mediums including, but in no way limited to, an internet connection (350), a dial-up or dedicated connection, or a wireless connection (370).

Returning again to FIG. 2, when the operations center (210) receives a threat level indication, the threat level indication is then communicated to the surveillance system interface (220) to be used in connection with and according to the threat level based surveillance control software/firmware (230). According to one exemplary embodiment, the security system interface (220) can include a hardware component configured to receive the threat level information. As mentioned previously, the threat level information can be provided to the security system interface (220) in numerous ways, such as from the operations center (210) via an internet connection, through a dial-up connection or wirelessly (i.e. radio interface). Threat level information can additionally be provided to the security system interface (220) locally through wired and/or wireless connections, a voice response system or via the internet. As illustrated in FIG. 2, the local communication of threat level information may be provided by local threat level changes (222) as input by a graphical user interface (GUI) or voice command, or as triggered by a direct local alarm input (224), as generated by a the triggering of a panic button, intrusion sensor (i.e. motion detection,. glass breakage, forced entry, etc.), fire alarm (heat/smoke/fire detection, pull boxes), power failure indicator, and/or environmental sensors (i.e. water, humidity, temperature, vibration).

In addition to receiving the threat level information, the security system interface (220) also provides inputs and outputs that can be used for connection to devices such as alarm contacts as well as for interfacing to other equipment for management, supervisory, and/or control purposes. Additionally, when required by legacy systems (i.e. coax based systems) any coax video stream interface components (228) used for controlling a legacy video stream can be incorporated into the security system interface (220).

According to one exemplary embodiment, the security system interface (220) is also configured to communicate threat level information, such as threat levels, source and time of threat level change, etc., to external sources (226). According to one exemplary embodiment illustrated in FIG. 2, the threat level may be provided to external sources by standalone alphanumeric displays (annunciators), as a status indication on local computing devices such as PDAs and laptops, or as a text message to wireless devices (phones, pagers, etc.) of previously identified personnel such as police or emergency personnel.

Furthermore, according to one exemplary embodiment, the security system interface (220) may be configured to provide outputs (analog, digital & I.P.) to control external devices in response to changes in threat levels. According to one exemplary embodiment, the security system interface (220) may be configured to control external alarm systems to initiate police or security response, control access control systems such as door locks to secure predetermined doors in a threat situation, building management systems such as lighting control (i.e. intelligent video detecting motion could leave lights on after hours while personnel are present), and/or public address systems by playing pre-recorded messages in response to changes in threat levels. Additionally, according to one exemplary embodiment, the surveillance system interface may also provide supervision of co-located systems including, but in no way limited to, UPS battery monitoring, equipment maintenance alarms (i.e. failure, high temperature), and unauthorized equipment access/tamper alarms.

Continuing with FIG. 2, the security system interface (220) is controlled by, or is communicatively linked to a computing device running a threat level based surveillance control software/firmware application (230). According to one exemplary embodiment, the threat level based surveillance control software/firmware application (230) is user configured with a rule set defining the permitted surveillance level of each camera and/or surveillance device under each specific threat level and then controls the system functionality appropriately based upon the current threat level communicated by the security system interface (220), or if a security system interface is not present, by local network threat level data (238). In one exemplary embodiment, depending upon the functionality desired, all or a portion of the threat level based surveillance control software/firmware application (230) can be incorporated directly into the surveillance system components (i.e. network cameras, digital video recorders or intelligent video devices) while for other systems (i.e., legacy "coax" or systems requiring enhanced functionality) the threat level based surveillance control software/firmware (230) may be provided entirely in an external unit such as the security system interface (220).

According to one exemplary embodiment, the threat level based surveillance control software/firmware application (230) includes a customizable user interface for each type of environment (i.e. schools, retail location, industrial location) that controls the features of the surveillance system (200), such as the recording, monitoring or analysis of camera imagery, based upon specific threat levels.

According to one exemplary embodiment, the threat level based surveillance control software/firmware application or module (230) provides a single, straightforward, intuitive interface to features of system components even in multi-vendor or multi-technology systems. Specifically, the interface generated by the threat level based surveillance control software/firmware module (230) may be user specific, or in other words, specially designed for each user. According to this exemplary embodiment, authorized users only requiring limited access to make threat level changes are presented a simple and streamlined screen. In contrast, administrators can be provided a more complex screen allowing them to perform system configurations (234), modify system date and time (235), and the like.

According to one exemplary embodiment, the threat level based surveillance control software/firmware application (230) is configured to identify and coordinate system features. For example, according to one exemplary embodiment, the threat level based surveillance control software/firmware application (230) is configured to coordinate on-site monitoring devices, allowing logical names to be assigned to groups or individual monitoring devices (i.e. "Security—Main Entrance", "Security—Roaming PDA", "Main Office", "Police—Wireless Devices", etc.). Additionally, the threat level based surveillance control software/firmware application (230) may monitor and adjust on-site recording quality (resolution, frame rate & storage time) depending on the threat level. Furthermore, control of known technologies may be incorporated into the threat level based surveillance control software/firmware application (230) including, but in no way limited to, remote access and monitoring and use of intelligent video devices using sophisticated threat identification processes such as graffiti detection from video analytics (236).

According to one exemplary embodiment, the threat level based surveillance control software/firmware application (230) allows an administrator to form logical and meaningful surveillance areas or groups and assign each group or area with a sensitivity designator. According to this exemplary embodiment, monitored locations having similar sensitivities to privacy may be grouped and named. For example, high privacy areas such as restrooms, locker rooms, and changing rooms may be grouped. Similarly, non-sensitive areas such as hallways, student parking lots, cafeterias, and libraries may be grouped and assigned a lower sensitivity designator. During operation, the threat level based surveillance control software/firmware application (230) may then correlate the assigned sensitivity designator with a received threat level to determine whether monitoring of the grouped areas is justified and/or to provide treatment to received video streams from the network cameras (237).

Additionally, the treatment of various areas by the threat level based surveillance control software/firmware application (230) may be modified based on a custom calendar. According to one exemplary embodiment, the sensitivity designator of the various grouped areas may be modified based on a predetermined event such as nighttime, weekends, holidays, sporting events, and the like.

Furthermore, the present threat level based surveillance control software/firmware application (230) receives information from the security system interface (220) and evaluates the received information to define a one-time event such as a change in threat level due to intrusion detection, a fire alarm, or a wireless radio interface such as from police transmitters or panic transmitters. According to one exemplary embodiment, when a one-time event is detected due to an alarm indication (236) or as received from the security system interface (220), data corresponding to the change in threat level is recorded on an electronic memory device. By recording any change in threat level, a history of each threat level status change is created that is traceable to an individual user or specific event. In addition to recording changes in threat levels, data may be uploaded to the operations center (210) for maintenance and to provide a secondary storage site for the threat level change data.

As illustrated in FIG. 2, the threat level based surveillance control software/firmware application (230) provides the functionality of the present exemplary threat based surveillance control system (200). As shown, the threat level based surveillance control software/firmware application (230) is communicatively coupled to the monitoring devices (231), the recording devices (232), and any remote access device such as a router or the like (233). Consequently, the threat level based surveillance control software/firmware application (230) generates the user interface viewed by anyone monitoring the system. Additionally, according to one exemplary embodiment, the threat level based surveillance control software/firmware application (230) manages, accesses, and executes the third party equipment protocols, voice response system/communications/security protocols, maintenance and software upgrades, and logging system used for efficient use of the present exemplary system.

Figure 4:
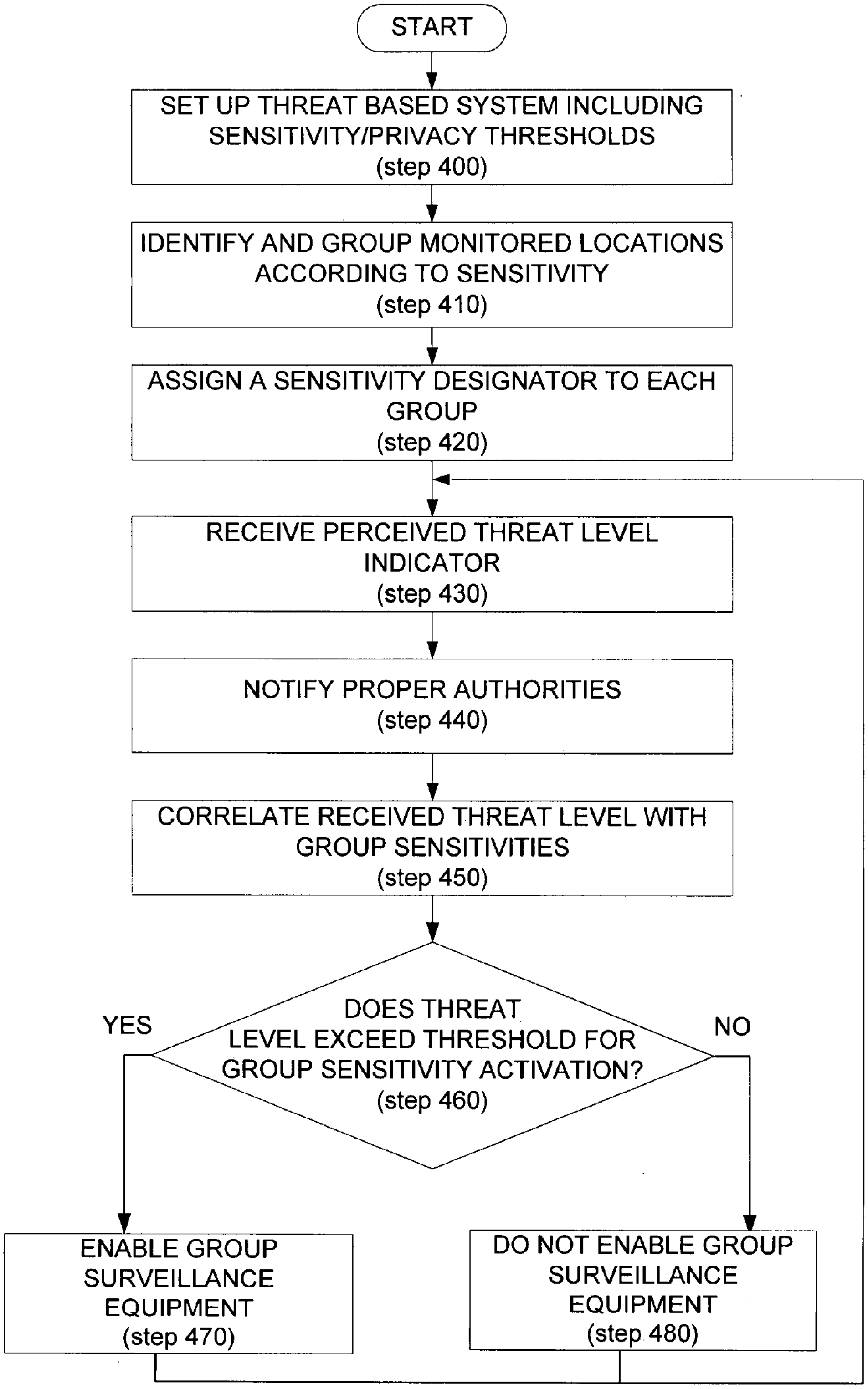
FIG. 4 is a flow chart illustrating a method for selectively configuring a surveillance system in response to a perceived threat level, according to one exemplary embodiment.

FIG. 4 illustrates an exemplary method of operation the present exemplary threat based surveillance control system (200), according to one exemplary embodiment. As illustrated in FIG. 4, the method begins by first setting up the threat based security system including establishing sensitivity and threat thresholds (step 400). According to one exemplary embodiment, during setup of the system (200), conditions and designators are established for areas of privacy sensitivity. Additionally, privacy thresholds indicating when a threat is severe enough to justify surveillance of the designated areas are established. According to one exemplary embodiment, the privacy threshold values are assigned relative to a sensitivity to privacy associated with each designated area. For example, a privacy threshold value associated with a locker room or restroom would be significantly larger than a privacy threshold value associated with a hallway, a commons area, or other public area. Consequently, it will take a larger threat to overcome the privacy threshold value and activate surveillance equipment associated with the highly sensitive area. According to one exemplary embodiment, the privacy threshold and the threat levels are each assigned numeric values corresponding in degree with both the desirability of privacy and the severity of the threat.

With the system (200) setup and the thresholds established, the monitored locations are identified and grouped according to sensitivity (step 410). According to one exemplary embodiment, the monitored locations are grouped and identified with a sensitivity designator (step 420) such that areas of similar sensitivity will be treated the same depending on perceived threats. Alternatively, each and every location being monitored may have an independent sensitivity designator.

With every designation assigned, the system (200) is ready to receive perceived threat level indicators (step 430). As mentioned previously, the threat level indicators may be received by the system (200) from a number of sources including, but in no way limited to an operations center (210; FIG. 2) or local alarm inputs (224; FIG. 2). Once the perceived threat level indicator is received (step 430), the threat level is evaluated and the proper authorities are notified (step 440) if the threat level triggers a need to contact authorities.

The received threat levels are then correlated with the established group sensitivities and privacy thresholds (step 450) for each monitored location. During correlation, the perceived threat level is compared to the privacy thresholds established for each group based on their sensitivities (step 460). According to one exemplary embodiment, if the threat level exceeds the predetermined threshold established for a particular group (YES, step 460), the surveillance equipment associated with the identified group is activated and the devices associated with the locations are enabled (step 470).

If, however, the perceived threat level does not exceed the threshold for an identified group (NO, step 460), the surveillance equipment associated with the group's areas is not activated (step 480). According to this exemplary embodiment, the system continues monitoring and collecting surveillance data on the identified group until another perceived threat level indicator is received (step 430).

Alternative Embodiments

According to one alternative embodiment, the present exemplary threat based surveillance control system (200) may be used to provide data to manage commercial and/or government shared wireless systems. For example, in the case of Wi-Fi networks, municipal Wi-Fi (wireless broadband) networks are becoming more and more popular. These networks typically provide a combination of "Public" and "Government" (i.e. Public Safety) usage. As the wireless bandwidth that is available is limited, it needs to be shared and the manner in which it is partitioned might need to be altered in a high threat level situation. The present threat based surveillance control system (200) can be applied to modify available bandwidth in high threat situations. Consequently, the present system could be used to automatically increase "Government" bandwidth when required without limiting "public" access during normal operation.

Similarly, the present threat based surveillance control system (200) can be applied to commercial radio systems such as IDEN (Sprint/Nextel). As wireless radio systems are becoming more complicated and thus more expensive, many critical users (i.e. "utilities" such as gas, water, and electric companies) are switching from private radio systems to commercial ones. As bandwidth on these systems is limited, the present threat based surveillance control system (200) can be applied to modify available bandwidth in high threat situations, thereby guaranteeing that priority communications are not compromised.

According to a second exemplary embodiment, the teachings of the present threat based surveillance control system (200) can be applied to provide data to manage network security systems. For example, in the case of firewalls, routers, and wireless access points, the level of corporate data network security is typically determined by evaluating the risk to the system and functionality required by the users. Networks that are too secure become more complicated, difficult to use, and less efficient. The present threat based surveillance control system (200) could be used to compliment network security systems and automatically adjust this security/functionality balance appropriately under high threat level situations, thereby making systems more secure without impacting performance under normal circumstances. Similarly, for data back-up services, the present threat based surveillance control system (200) can be utilized to add increased functionality to current data protection systems such as automatically performing more frequent or more "off-site" back-ups during elevated threat periods. Additionally, according to one exemplary embodiment, the present threat based surveillance control system (200) may interact with system software to modify safety setting and perform higher security operations. For example, according to one exemplary embodiment, the present threat based surveillance control system (200) may interact with e-mail software to block or strip attachments when an elevated threat level exists.

Furthermore, the present threat based surveillance control system (200) may be extended to access control systems and alarm systems. With regard to access control systems, providing access control systems with threat level information, different rules or access restrictions can be automatically implemented during high threat situations. For example, according to one exemplary embodiment, areas that are accessible to "visitors" normally, such as parking structures, could become temporally restricted during high threat situations. This permits access control systems to allow normal facility access during standard conditions while providing increased protection only when needed.

Providing alarm systems with threat level information, different protection levels can be applied automatically during high threat situations. For example, during normal hours when a perimeter alarm system would have been otherwise deactivated, in an elevated threat level situation, special "zoning" can be activated providing protection of secondary entrances and coverage such as glass breakage. Additionally, for a "natural" threat such as a hurricane, "open" windows or doors throughout the facility, that are otherwise unsupervised when the system is disarmed, could be monitored. This would allow the alarm system to be more efficient by offering increased functionality.

In conclusion, the present system and method provides a system and a method for selectively monitoring sensitive areas depending on threat levels. More specifically, the present system and method provide variable levels of observation proportionate to the current threat levels includes a surveillance system interface configured to selectively activate and deactivate inputs and outputs to surveillance devices based on a received threat level and controlling software defining which inputs and outputs are selectively activated based on a received threat level.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A method for selectively monitoring a plurality of privacy sensitive areas, each containing surveillance equipment, comprising:

assigning each of said plurality of privacy sensitive areas a privacy threshold value, wherein said plurality of privacy sensitive areas includes at least one privacy sensitive area having a first privacy threshold value and a second privacy sensitive area having a second privacy threshold value;

receiving a threat level without using said surveillance equipment;

selectively activating an sensor of said surveillance equipment associated with each of said plurality of privacy sensitive areas when said threat level exceeds said privacy threshold value; and deactivating said sensor of said surveillance equipment associated with each of said plurality of privacy sensitive areas when said threat level does not exceed said privacy threshold value.

2. The method of claim 1, further comprising:

assigning each of said plurality of privacy sensitive areas said privacy threshold value based on an occupant's expected level of privacy in each of said privacy sensitive areas.

3. The method of claim 2, further comprising assigning a single privacy threshold value to two or more privacy sensitive areas that have substantially similar expected levels of privacy in each of said privacy sensitive areas.

4. The method of claim 1, wherein said assigning said privacy sensitive area a privacy threshold value comprises:

evaluating a degree of privacy desired in each of said privacy sensitive areas; and assigning said privacy threshold value in relation to said degree of privacy desired in each of said privacy sensitive areas.

5. The method of claim 1, wherein said receiving a threat level comprises receiving a threat level information from a federal government, a state government, or a local government in an operations center.

6. The method of claim 5, wherein said threat level information is used by an operations center to calculate a threat level value by receiving said threat level information and assigning a threat level value to said threat level information based on a severity of said threat level information.

7. The method of claim 6, wherein said threat level information is received by said operations center from an automated threat level change.

8. The method of claim 7, wherein said automated threat level change is received from one of a department of homeland security or an oceanic and atmospheric administration for natural disasters.

9. The method of claim 6, wherein said threat level information is received by said operations center from a manual threat level change.

10. The method of claim 6, wherein said threat level information is received from a local alarm input.

11. The method of claim 1, wherein said selectively activating an inactive sensor of said surveillance equipment when said threat level exceeds said privacy threshold value comprises:

comparing said threat level to said privacy threshold value in each of said plurality of privacy sensitive areas; and activating one of a surveillance camera, a motion sensor, or an audio receptive device associated with each of said plurality of privacy sensitive areas when said threat level exceeds said privacy threshold value.

12. The method of claim 1, wherein:

said receiving a threat level is received in a security system interface;

said received threat level is transmitted to a threat level based surveillance control software or firmware module associated with each of said plurality of privacy sensitive areas;

wherein each of said threat level based surveillance control software or firmware module compares said received threat level to said privacy threshold value associated with each of said plurality of privacy sensitive areas; and selectively activating at least one inactive sensor of surveillance equipment associated with each of said plurality of privacy sensitive areas when said received threat level exceeds said privacy threshold value.

13. The method of claim 12, wherein said threat level based surveillance control software or firmware module is disposed in a surveillance camera associated with each of said plurality of privacy sensitive areas.

14. The method of claim 1, further comprising:

identifying a source responsible for authorizing said threat level; and recording said identification.

15. A method for selectively monitoring a plurality of privacy sensitive areas, each containing surveillance equipment, comprising:

assigning each of said plurality of privacy sensitive areas an independent privacy threshold value including evaluating a degree of privacy desired in each of said privacy sensitive areas and assigning said privacy threshold value in relation to said desire for privacy in each of said privacy sensitive areas;

receiving a threat level without using said surveillance equipment; and comparing said threat level to said privacy threshold value for each of said privacy sensitive areas and activating at least one inactive sensor of surveillance equipment associated with each of said privacy sensitive areas when said threat level exceeds said privacy threshold value in each of said privacy sensitive areas and deactivating said at least one sensor of said surveillance equipment associated with each of said privacy sensitive areas when said threat level does not exceed said privacy threshold value in each of said privacy sensitive areas;

wherein said activating an inactive sensor of surveillance equipment associated with each of said privacy sensitive areas includes activating one of a surveillance camera, a motion sensor, or an audio receptive device associated with said privacy sensitive area when said threat level in each of said privacy sensitive areas exceeds said independent privacy threshold value.

16. The method for selectively monitoring said plurality of privacy sensitive areas of claim 15, wherein determining said threat level comprises receiving a numeric value from a federal government, a state government, or a local government in an operations center, wherein said numeric value corresponds with said threat level.

17. The method of claim 16, wherein said threat level value determined in said operations center is calculated by receiving a current threat level condition and assigning a numeric threat level value to said threat level condition based on a severity of said threat level condition.

18. A system for selectively monitoring a plurality of privacy sensitive areas, comprising:

a surveillance component configured to be associated with each of said plurality of privacy sensitive areas, the surveillance component having a sensor;

a surveillance system interface configured to selectively activate and deactivate said sensor based on a threat level received without using said surveillance component; and a software or firmware module configured to access a privacy threshold value independently associated with each of said privacy sensitive areas based on an occupant's expected level of privacy in each of said privacy sensitive areas and determine whether said received threat level is sufficiently high to selectively activate said sensor;

wherein said sensor is deactivated when said received threat level is not above said privacy threshold value independently associated with each of said privacy sensitive areas.

19. The system of claim 18, wherein said system includes a manually entered threat level value associated with each of said privacy sensitive areas.

20. The system of claim 19, further comprising an operations center communicatively coupled to said surveillance system interface;

wherein said operations center is configured to receive a threat level condition from one of a federal government, a state government, or a local government, assign a threat level value to said received threat level condition, and transmit said assigned threat level condition to said surveillance system interface.

21. The system of claim 20, wherein said software or firmware module is configured to:

receive said assigned threat level condition;

compare said assigned threat level condition to said privacy threshold value; and activate said senor of said surveillance component configured to be associated with each of said privacy sensitive areas when said assigned threat level exceeds each of said privacy threshold values.

22. The system of claim 21, wherein said software or firmware module is resident on said surveillance component configured to be associated with each of said privacy sensitive areas.

* * * * *